(12) United States Patent
Cho et al.

(10) Patent No.: US 8,804,063 B2
(45) Date of Patent: Aug. 12, 2014

(54) IMAGE DISPLAY DEVICE

(75) Inventors: Jin Hyun Cho, Seoul (KR); Hyun Jun Jung, Yongin-si (KR); Sru Kim, Anyang-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 146 days.

(21) Appl. No.: 13/107,284

(22) Filed: May 13, 2011

(65) Prior Publication Data

US 2011/0285933 A1 Nov. 24, 2011

(30) Foreign Application Priority Data

May 18, 2010 (KR) .................. 10-2010-0046627

(51) Int. Cl.
*G02F 1/1333* (2006.01)

(52) U.S. Cl.
USPC .............................................. 349/58

(58) Field of Classification Search
CPC ................ G02F 1/133308; G02F 1/133608
USPC ................................................ 349/58–60
See application file for complete search history.

(56) References Cited

U.S. PATENT DOCUMENTS

2008/0024965 A1* 1/2008 Iwamoto et al. ............. 361/681

* cited by examiner

*Primary Examiner* — Phu Vu
(74) *Attorney, Agent, or Firm* — Sughrue Mion, PLLC

(57) ABSTRACT

An image display device includes a rear cover to receive a display panel. The rear cover is provided with a deformation alleviating portion that deforms due to expansion of a surrounding portion caused by thermal stress. The deformation alleviating portion reinforces the rear cover and prevents thermal deformation of the rear cover, enabling realization of a slim image display device.

16 Claims, 6 Drawing Sheets

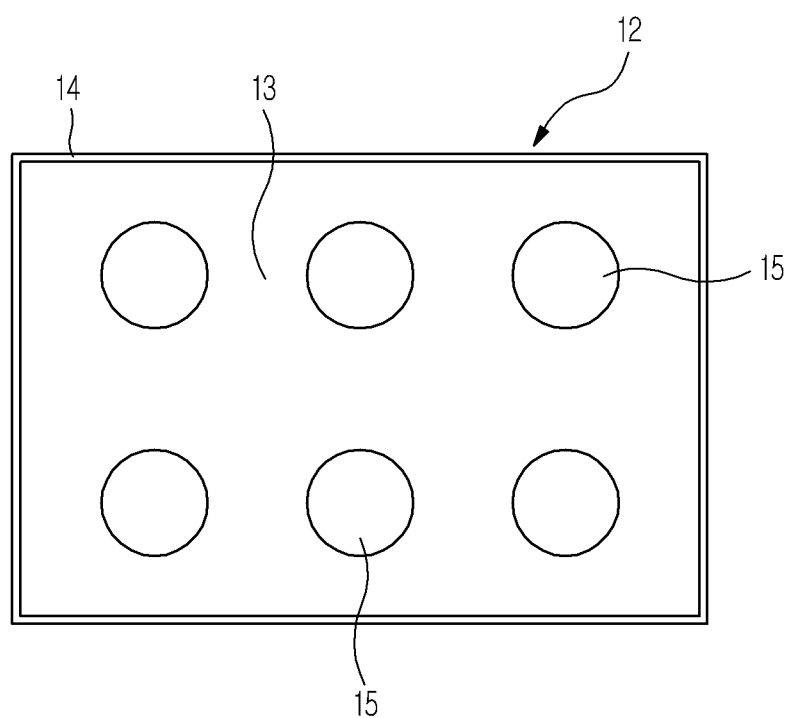

IMAGE DISPLAY DEVICE

CROSS-REFERENCE TO RELATED APPLICATION

This application claims priority from Korean Patent Application No. 2010-0046627, filed on May 18, 2010 in the Korean Intellectual Property Office, the disclosure of which is incorporated herein in its entirety by reference.

BACKGROUND

1. Field

Exemplary embodiments relate to a slim image display device having a rear cover to increase rigidity.

2. Description of the Related Art

Recently, instead of a conventional Cathode Ray Tube (CRT), flat panel image display devices, such as a Liquid Crystal Display (LCD), Plasma Display Panel (PDP), Electroluminescent Display (ELD), and Field Emission Display (FED), have been developed. These flat panel image display devices have advantageous characteristics including small thickness, low weight and low electricity consumption.

In particular, as compared to other flat panel image display devices, a liquid crystal display has a smaller thickness and lower weight and also, consumes less electricity and drive voltage. For this reason, a liquid crystal display has been widely used throughout many industrial fields, the thickness and weight of which continue to be reduced to assure competitiveness.

Such a liquid crystal display includes a liquid crystal panel to display an image and a backlight unit to emit light to the liquid crystal panel. The liquid crystal panel and the backlight unit are received and supported in a metallic housing.

With a recent tendency of a slim liquid crystal display, the thickness of the housing is increasingly reduced, and consequently methods to prevent, e.g., distortion or bending of the small thickness housing have been proposed.

SUMMARY

Therefore, it is an aspect of the exemplary embodiments to provide an image display device, which employs a slim design owing to a rear cover which minimizes distortion and deformation.

Additional aspects will be set forth in part in the description which follows and, in part, will be obvious from the description, or may be learned by practice of the exemplary embodiments.

An aspect of an exemplary embodiment provides an image display device includes a cover on which a display panel to form an image is disposed, wherein the cover includes a base includes at least one deformation alleviating portion that deforms in response to a variation in size of the base caused by thermal stress.

The deformation alleviating portion may be a slightly concave and convex surface portion of the base.

The deformation alleviating portion may have a round cross section.

The deformation alleviating portion may be indented in or raised from the surface of the base.

The cover may be made of a metal.

The deformation alleviating portion may be provided at a central region of the cover.

The at least one deformation alleviating portion may include a plurality of deformation alleviating portions spaced apart from one another.

The image display device may be a liquid crystal display including an edge type backlight unit to emit light to the display panel.

The deformation alleviating portion may be formed by pressing, in which a punch presses the base in a first direction to form a concave and convex pattern and subsequently, presses a bottom of the concave and convex pattern in an opposite direction of the first direction.

An aspect of another exemplary embodiment provides an image display device includes a liquid crystal display panel, a backlight unit to emit light to the liquid crystal display panel, and a cover having a base on which the backlight unit is disposed, wherein the base is provided with at least one deformation alleviating portion that expands in response to thermal stress to compensate for a length variation of the base.

The deformation alleviating portion may be a slightly concave and convex surface portion of the base.

The deformation alleviating portion may have a height of about 3 mm or less.

The deformation alleviating portion may be provided at a central region of the base.

The deformation alleviating portion may be formed by pressing, in which a punch presses the base in a first direction to form a concave and convex pattern and subsequently, presses a bottom of the concave pattern in an opposite direction of the first direction to return the concave and convex pattern to an original state thereof.

The backlight unit may be of an edge type and may include a light source unit using light emitting diodes.

BRIEF DESCRIPTION OF THE DRAWINGS

These and/or other aspects will become apparent and more readily appreciated from the following description of the exemplary embodiments, taken in conjunction with the accompanying drawings of which:

FIG. 5 is a view illustrating another exemplary embodiment of the deformation alleviation portion of the rear cover.

DETAILED DESCRIPTION OF THE EXEMPLARY EMBODIMENTS

Figure 1:
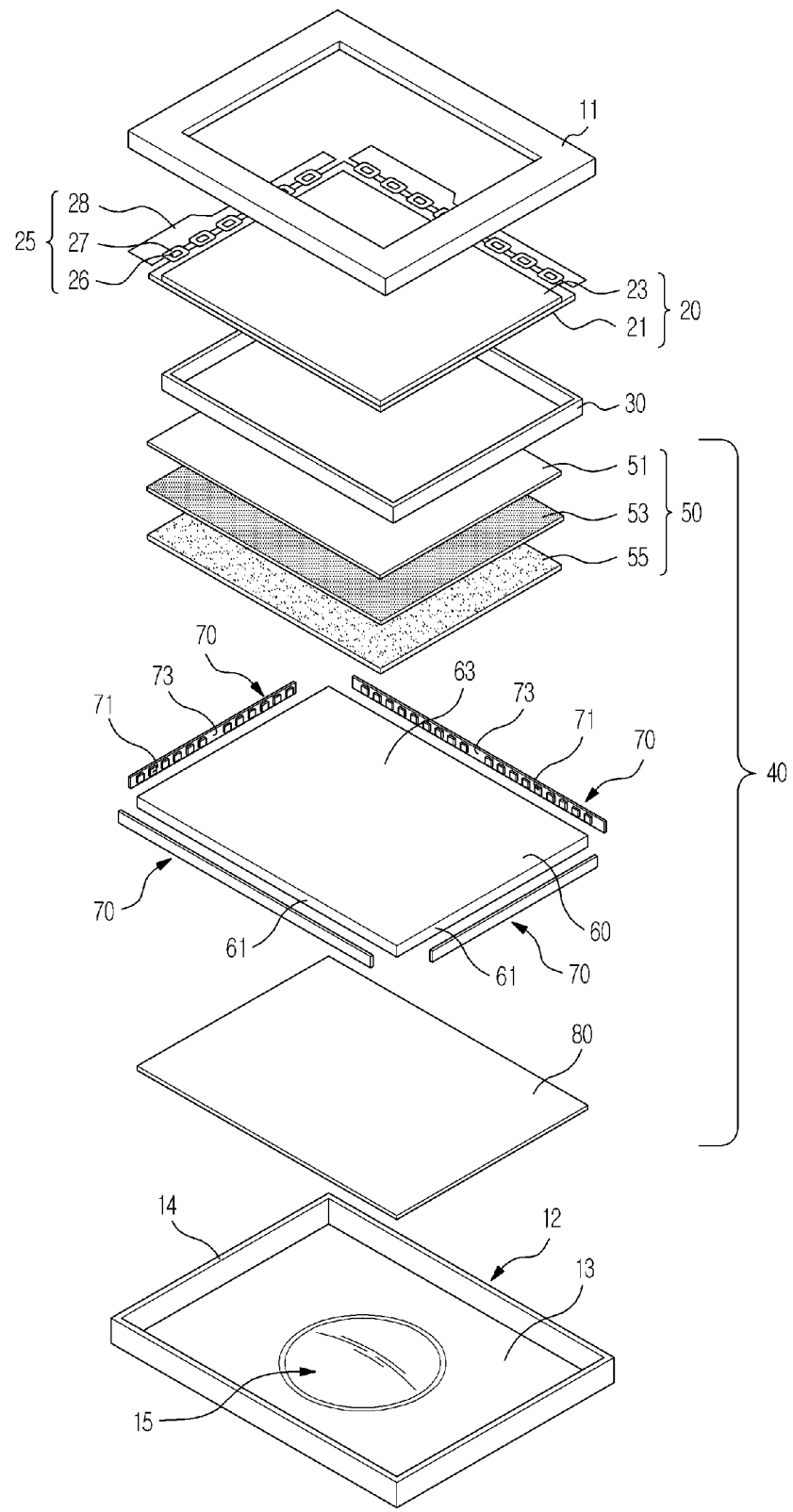
FIG. 1 is a perspective view illustrating a schematic configuration of an image display device in accordance with an exemplary embodiment.

Reference will now be made in detail to the exemplary embodiments, examples of which are illustrated in the accompanying drawings, wherein like reference numerals refer to like elements throughout.

Figure 2:
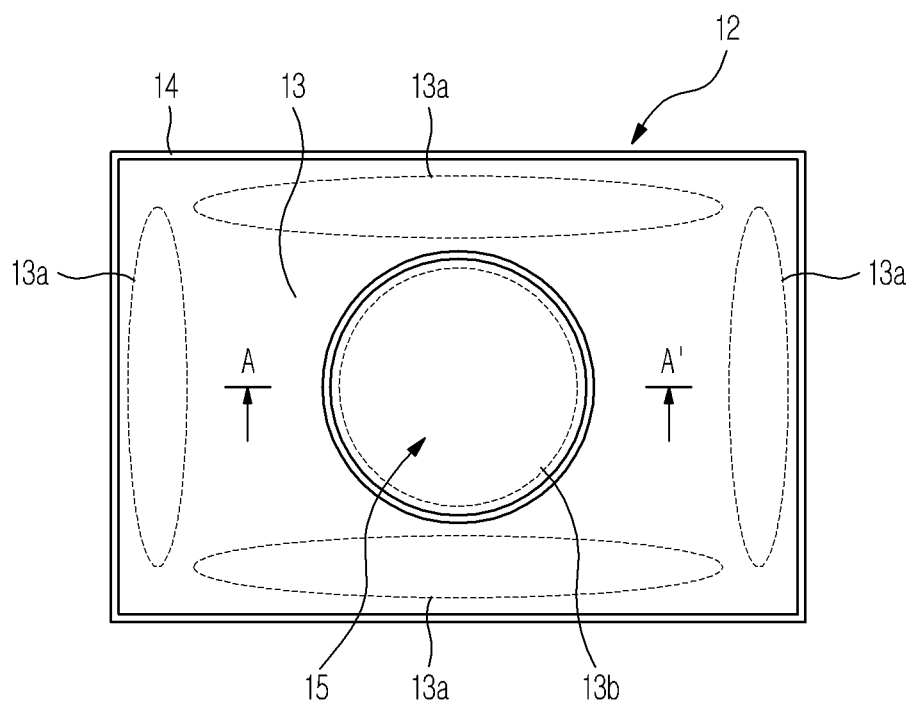
FIG. 2 is a plan view illustrating a rear cover in accordance with the exemplary embodiment.
Figure 3A:
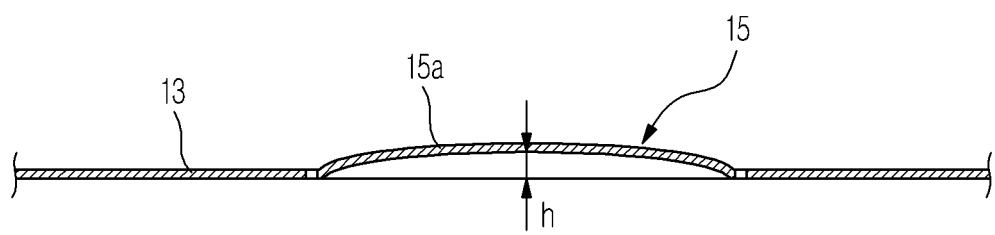
FIG. 3A is a sectional view taken along the line A-A' of FIG. 2.
Figure 3B:
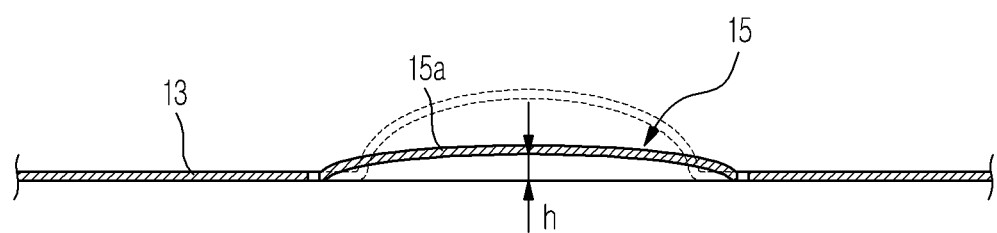
FIG. 3B is a sectional view taken along the line A-A of FIG. 2 illustrating in phantom the convex portion 15 in a deformed state.

FIG. 1 is a perspective view illustrating a schematic configuration of an image display device in accordance with an exemplary embodiment, FIG. 2 is a plan view illustrating a rear cover in accordance with the exemplary embodiment, and FIGS. 3A and 3B are sectional views taken along the line A-A' of FIG. 2.

The present exemplary embodiment describes a liquid crystal display as one example of an image display device, but is not limited thereto, and may be applied to a Flat Panel Display (FPD), such as a Plasma Display Panel (PDP), Electroluminescent Display (ELD), Field Emission Display (FED), and the like.

As illustrated in FIG. 1, the liquid crystal display device in accordance with the exemplary embodiment includes a liquid crystal display panel 20 to form an image, a backlight unit 40 placed on a rear surface of the liquid crystal display panel 20, and cover members 11 and 12 in which the liquid crystal display panel 20 and backlight unit 40 are received.

The cover members 11 and 12 include a front cover 11 and a rear cover 12. The front cover 11 may take the form of a centrally open rectangular frame, and the rear cover 12 may take the form of a frontwardly open box. In another exemplary embodiment, the front cover 11 is an upper cover and the rear cover 12 is a lower cover of the display device.

The front cover 11 and the rear cover 12 may be coupled to each other to define an outer appearance of the liquid crystal display.

The liquid crystal display panel 20 and the backlight unit 40 may be received between the front cover 11 and the rear cover 12. Specifically, the liquid crystal display panel 20 may be seated on a plastic mold frame 30.

The liquid crystal display panel 20 includes a thin film transistor substrate 21 on which thin film transistors are formed, a color filter substrate 23 facing the thin film transistor substrate 21, and a liquid crystal layer (not shown) provided between the thin film transistor substrate 21 and the color filter substrate 23.

A drive unit 25 to apply a drive signal is provided at a side of the thin film transistor substrate 21.

The drive unit 25 includes a flexible printed circuit board 26, a drive chip 27 mounted on the flexible printed circuit board 26, and a printed circuit board 28 connected to a side of the flexible printed circuit board 26.

The drive unit 25 is of a Chip-On-Film (COF) type. Alternatively, the drive unit 25 may be of a Tape-Carrier-Package (TCP) type, Chip-On-Glass (COG) type, or other known types. The drive unit 25 may be mounted on the thin film transistor substrate 21.

Although the above described liquid crystal display panel 20 forms an image by adjusting alignment of the liquid crystal layer, the liquid crystal display panel 20 is not a light emitting device and may need to receive light from the backlight unit 40 located on the rear surface thereof.

The backlight unit 40 includes a plurality of optical films 50 located at the rear side of the liquid crystal display panel 20, a light guide plate 60 located at the rear side of the optical films 50, light source units 70 around the light guide plate 60, and a reflecting plate 80 located at the rear side of the light guide plate 60.

The optical films 50 located at the rear side of the liquid crystal display panel 20 include a protective film 51, prism films 53 and a diffusive film 55.

The diffusive film 55 includes an embossed coating layer formed on a base plate and serves to diffuse light to be directed from the light source units 70 to the liquid crystal display panel 20.

The prism films 53 respectively includes an array of pyramidal prisms formed on a front surface thereof to condense the diffused light from the diffusive film 55 in a direction perpendicular to a plane of the liquid crystal display panel 20 located thereabove. Generally, two sheets of prism films 53 are used and micro-prisms of the respective prism films 53 have a predetermined angle. Most of the light having passed through the prism films 53 advances perpendicular to the liquid crystal display panel 20, thus providing uniform brightness distribution.

The protective film 51 is located on the prism films 53 and protects the prism films 53, which are sensitive to dust, scratch, and the like.

The light guide plate 60 is made of acryl resin, such as polymethylmethacrylate (PMMA), or polymethylstyrene (a copolymer of methylmethacrylate and styrene), and serves to uniformly supply the light emitted from the light source units 70 to the diffusive film 55.

The light guide plate 60 includes an incidence surface 61 facing the light source units 70, an emission surface 63 facing the diffusive film 55, and a reflecting surface (not shown) parallel to the emission surface 63.

Each of the light source units 70 may include a plurality of light emitting diodes 71 and a printed circuit board 73 to apply electric signals to the plurality of light emitting diodes 71 mounted thereon.

The light source unit 70 of the exemplary embodiment includes light emitting diodes 71, but is not limited thereto, and may use any other light emitting devices, such as a fluorescent lamp, etc.

The plurality of light emitting diodes 71 may include a plurality of diodes emitting only white light, or may be a combination of diodes emitting red, green and blue lights.

The printed circuit board 73 may be a metal printed circuit board made of, for example, a highly thermally conductive silicon steel plate, galvanized steel plate, aluminum disc, or the like. The printed circuit board 73 serves not only to apply drive signals to the light emitting diodes 71, but also to emit heat generated from the light emitting diodes 71.

The light source units 70 are arranged to face at least one side surface of the light guide plate 60. Specifically, the light source units 70 may be arranged around the light guide plate 60 to emit light toward the incidence surface 61 formed on the circumference of the light guide plate 60.

More specifically, the light source units 70 may be arranged at opposite upper and lower sides and opposite left and right sides of the light guide plate 60 to face one another, or may be arranged only at one side of the light guide plate 60.

Although the present exemplary embodiment describes the backlight unit 40 of an edge type in which the light source units 70 are arranged around the light guide plate 60 to direct light through the light guide plate 60, the backlight unit 40 may be of a direct type such that the light source unit 70 is arranged at the front side of the reflecting plate 80 to emit light to the liquid crystal display panel 20. When using the direct type backlight unit 40, the light guide plate 60 may be omitted.

The reflecting plate 80 is located at the rear side of the light guide plate 60 and serves to reflect rearwardly-directed light toward the light guide plate 60. The reflecting plate 80 may be made of plastic, such as polyethyleneterephthalate (PET) or polycarbonate (PC).

The light guide plate 60, the light source unit 70 and the reflecting plate 80 are received in the rear cover 12, and in turn, the rear cover 12 may be coupled to the mold frame 30.

The rear cover 12 may take the form of a frontwardly open box including a base 13, which may be rectangular, and a sidewall 14 extending frontward from the circumference of the base 13.

The reflecting plate 80 may be disposed or supported on the base 13 of the rear cover 12 and the light guide plate 60 may be disposed on an front surface of the reflecting plate 80.

The rear cover 12 may be made of a metal, such as aluminum, etc. The base 13 may have a considerably reduced thickness (i.e. a thickness of about 30 mm or less) to realize a slim design of the liquid crystal display.

In general, a small thickness rear cover may be easily deformed due to an uneven temperature difference caused by heat generated during operation of the liquid crystal display.

To prevent such deformation, the rear cover 12 of the present exemplary embodiment may be provided with at least one deformation alleviating portion 15 to alleviate thermal deformation of the base 13.

Referring to FIG. 2, in the case of the liquid crystal display including the edge type backlight unit 40, the light source units 70 are arranged at peripheral regions 13a of the base 13 and therefore, the peripheral regions 13a of the base 13 have a higher temperature than a central region 13b of the base 13.

Due to a temperature difference between different positions of the base 13, the peripheral regions 13a of the base 13 exhibit thermal expansion, whereas the central region 13b of the base 13 acts to pull the peripheral regions 13a. The thermal expansion causes the peripheral regions 13a to increase in size along a plane parallel to the rear cover 12.

In this case, to compensate for the size variation when the peripheral regions 13a of the base 13 expand by a predetermined amount, as illustrated in FIGS. 3A and 3B, the deformation alleviating portion 15 may be a slightly concave or convex portion 15a having a predetermined height from a surface of the base 13. As illustrated in FIG. 1, the deformation alleviating portion 15 may have a round cross section. The deformation alleviating portion 15 may be disposed at a location where the light source units 70 are not located, for example in the central region 13a.

When the base 13 thermally expands, the slightly concave or convex portion 15a formed at a local area of the base 13 may compensate for an increased length of the central region 13b of the base 13 and also, may reinforce the rear cover 12. In the exemplary embodiment, the concave portion 15 deforms or bulges so that the height h increases, as shown in FIG. 3B.

The height h of the concave or convex portion 15a may be about 3 mm or less. The present exemplary embodiment describes the deformation alleviating portion 15 as being formed at the central region 13b of the base 13 to have a predetermined size, but is not limited thereto. Alternatively, as illustrated in FIG. 5, a plurality of deformation alleviating portions 15 may be spaced apart from one another.

When the deformation alleviating portion 15 is provided at the central region 13b of the base 13, the deformation alleviating portion 15 has no negative effect on the outer appearance of the liquid crystal display because the central region 13b of the base 13 is hidden by a stand (not shown) that supports the liquid crystal display.

Figure 4:
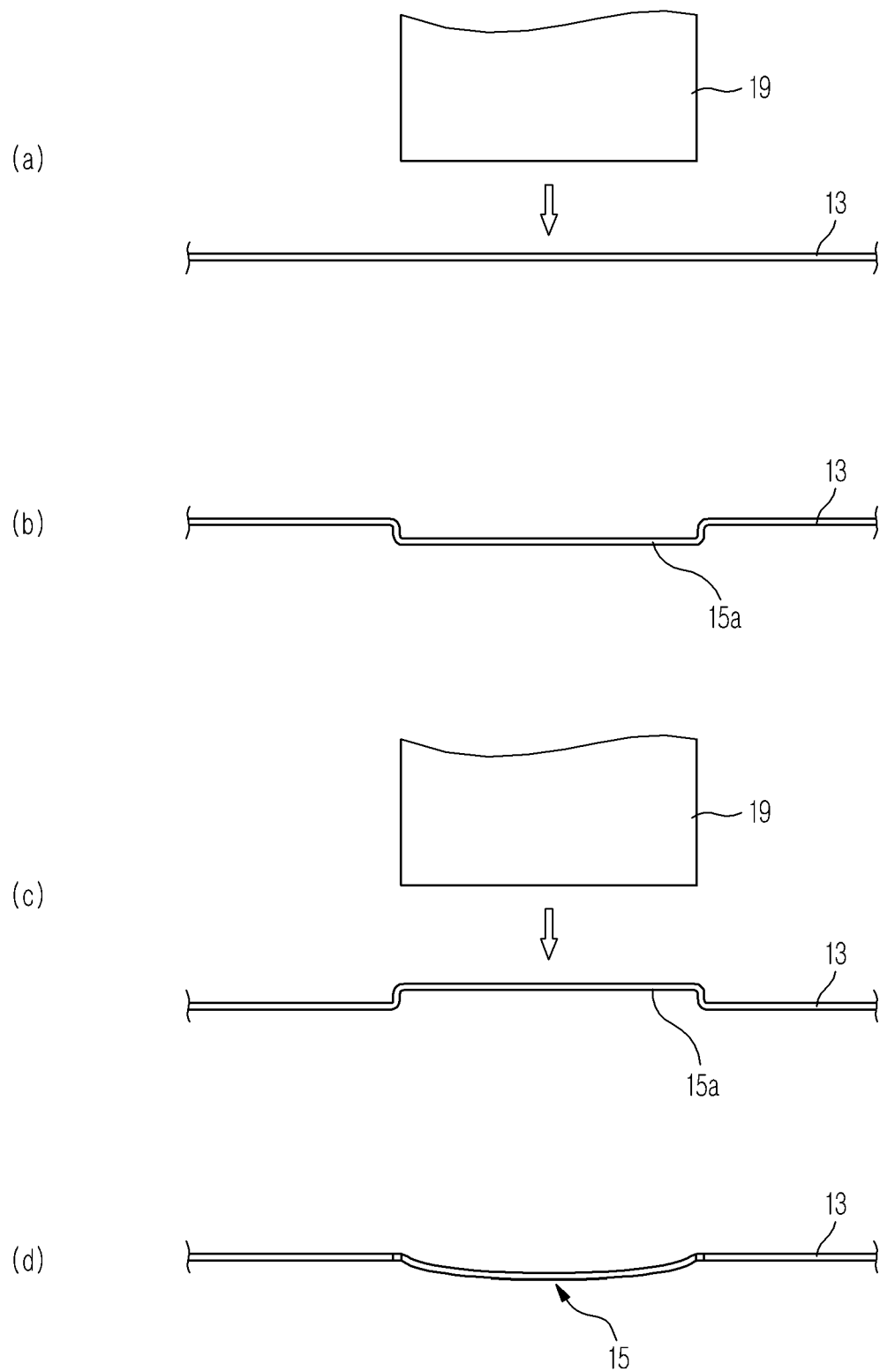
FIG. 4 is a view illustrating the sequence of a process of forming a deformation alleviating portion of the rear cover in accordance with the exemplary embodiment.

FIG. 4 is a view illustrating the sequence of a process of forming the deformation alleviation portion of the rear cover in accordance with an exemplary embodiment.

As illustrated in FIG. 4, the deformation alleviating portion 15 may be formed by pressing.

First, as illustrated in FIG. 4(a), in a state wherein the base 13 of the rear cover 12 is put on a die (not shown) of a press (not shown) with a top surface of the base facing the die, a punch 19 applies predetermined pressure to the base 13 to form a concave and convex pattern, e.g., a concave portion 15a, on the base 13 as illustrated in FIG. 4(b). The punch 19 may have a hollow cylinder shape or solid rod shape.

Next, as illustrated in FIG. 4(c), a flattening operation is performed as the punch 19 applies predetermined pressure to the bottom surface of the concave portion 15a, to return the concave portion 15a of the base 13 to an original state thereof.

With the above described press process, as illustrated in FIG. 4(d), the deformation alleviating portion 15 may be a slightly convex or convex portion formed at a local region of the base 13 to have a predetermined height.

Although a typical rear cover made of a metal, such as aluminum, etc., may be easily distorted or bent, and thus may need a relatively great thickness to obtain a sufficient rigidity to avoid deformation, the rear cover 12 of the present exemplary embodiment may be free from distortion or deformation due to accommodation of the thermal expansion of the base owing to the deformation alleviating portion 15. Thus, it may be unnecessary to provide an additional reinforcing member or to increase the thickness of the rear cover 12 and thus, the image display device may have a reduced thickness.

The small thickness rear cover 12 having the deformation alleviating portion 15 may be free from distortion caused during blanking using a press mold, resulting in enhanced productivity.

As is apparent from the above description, an image display device according to an exemplary embodiment may prevent deformation of a rear cover due to thermal stress, thereby realizing a slim rear cover and consequently, a slim image display device.

Although a few exemplary embodiments have been shown and described, it would be appreciated by those skilled in the art that changes may be made in these exemplary embodiments without departing from the principles and spirit of the inventive concept, the scope of which is defined in the claims and their equivalents.

What is claimed is:

1. An image display device comprising a cover on which a display panel to form an image is disposed,
   wherein the cover comprises a base comprising a plurality of deformation alleviating portions that deforms in response to a variation in size of the base caused by thermal stress and are spaced apart from one another,
   wherein each of the plurality of deformation alleviating portions comprises:
      an outermost edge; and
      a concave surface portion provided on an inner side of the outermost edge, and
   wherein the outermost edge of the each of the plurality of deformation alleviating portions forms a circle.

2. The image display device according to claim 1, wherein the plurality of deformation alleviating portions are indented in or raised from a surface of the base.

3. The image display device according to claim 1, wherein the cover is made of a metal.

4. The image display device according to claim 3, wherein the plurality of deformation alleviating portions are disposed at a central region of the cover.

5. The image display device according to claim 4, wherein the image display device comprises a liquid crystal display comprising an edge type backlight unit which emits light to the display panel.

6. The image display device according to claim 3, wherein the plurality of deformation alleviating portions are formed by pressing, in which a punch presses the base in a first direction to form a concave portion and subsequently, presses a bottom of the concave portion in an opposite direction of the first direction.

7. An image display device comprising:
   a liquid crystal display panel;
   a backlight unit configured to emit light to the liquid crystal display panel; and
   a cover comprising a base on which the backlight unit is disposed, wherein the base comprises a plurality of deformation alleviating portions that deform to compensate for a variation in size of the base caused by thermal stress and are spaced apart from one another,
wherein each of the plurality of deformation alleviating portions comprises:
an outermost edge; and
a concave surface portion provided on an inner side of the outermost edge, and
wherein the outermost edge of the each of the plurality of deformation alleviating portions forms a circle.

8. The image display device according to claim 7, wherein the plurality of deformation alleviating portions comprise a height of about 3 mm or less.

9. The image display device according to claim 7, wherein the plurality of deformation alleviating portions are disposed at a central region of the base.

10. The image display device according to claim 7, wherein the plurality of deformation alleviating portions are formed by pressing, in which a punch presses the base in a first direction to form a concave portion and subsequently, presses a bottom of the concave portion in an opposite direction of the first direction.

11. The image display device according to claim 7, wherein the backlight unit is of an edge type and comprises a light source unit using light emitting diodes.

12. The image display device according to claim 1, wherein the cover comprises at least one sidewall extending substantially perpendicularly from an edge of the base and provided at a periphery of the display panel.

13. An image display device according to claim 7, wherein the cover comprises at least one sidewall extending substantially perpendicularly from an edge of the base and provided at a periphery of the backlight unit.

14. An image display device comprising:
a display panel to form an image; and
a cover comprising a plurality of deformation portions configured to deform in a direction away from the cover in response to an increased size of a surrounding portion caused by thermal stress and spaced apart from one another,
wherein each of the plurality of deformation alleviating portions comprises:
an outermost edge; and
concave surface portion provided on an inner side of e outermost edge, and
wherein the outermost edge of the each of the plurality of deformation alleviating portions forms a circle.

15. The image display device according to claim 14, wherein the plurality of deformation portions are disposed in a central region of the cover.

16. A method of forming a cover of an image display device, the method comprising:
Pressing a surface of a die onto a first surface of a base of the cover to form each of a plurality of concave portions spaced apart from one another on the base, the surface of the die corresponding to an outermost edge of the each of the plurality of concave portions;
pressing the surface of the die onto a second surface of the base opposite to and facing the first surface of the base against the concave portions to deform the concave portions.

* * * * *